United States Patent
Kano et al.

(10) Patent No.: US 11,463,181 B2
(45) Date of Patent: Oct. 4, 2022

(54) MOBILE TERMINAL TEST APPARATUS, MOBILE TERMINAL TEST SYSTEM, AND CONTROL METHOD FOR MOBILE TERMINAL TEST APPARATUS

(71) Applicant: ANRITSU CORPORATION, Kanagawa (JP)

(72) Inventors: Daiki Kano, Kanagawa (JP); Takumi Nakamura, Kanagawa (JP); Daisuke Nakagawa, Kanagawa (JP); Masato Takeuchi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/559,266

(22) Filed: Dec. 22, 2021

(65) Prior Publication Data
US 2022/0239388 A1     Jul. 28, 2022

(30) Foreign Application Priority Data

Jan. 28, 2021   (JP) .............. JP2021-012007

(51) Int. Cl.
*H04B 17/15*   (2015.01)
*H04B 17/29*   (2015.01)

(52) U.S. Cl.
CPC .......... *H04B 17/15* (2015.01); *H04B 17/29* (2015.01)

(58) Field of Classification Search
CPC ..................................... H04B 17/15
See application file for complete search history.

(56) References Cited

U.S. PATENT DOCUMENTS

| | | | | |
|---|---|---|---|---|
| 5,774,725 A | * | 6/1998 | Yadav ........... | G06F 11/3696 719/331 |
| 2006/0003810 A1 | * | 1/2006 | Saikyo ........... | H04W 24/00 455/566 |
| 2011/0026480 A1 | * | 2/2011 | Kim ........... | H04B 7/0413 370/329 |
| 2014/0092750 A1 | | 4/2014 | Aoki | |

FOREIGN PATENT DOCUMENTS

JP        2014-72838 A     4/2014

* cited by examiner

*Primary Examiner* — Hsinchun Liao
(74) *Attorney, Agent, or Firm* — Pearne & Gordon LLP

(57) ABSTRACT

Provided are a mobile terminal test apparatus, a mobile terminal test system, and a control method for the mobile terminal test apparatus, which can reduce burdens on a user for setting parameters according to a specification of a test. A setting screen is displayed with a first operation image 21 for selecting a specification of a test and a second operation image 22 in which parameter operation images 22*a* to 22*e* for setting parameters for executing the test according to the specification selected by an operation with respect to the first operation image 21 are arranged based on parameter hierarchies. With an operation of changing one parameter with respect to the parameter operation images 22*a* to 22*e*, lower parameter operation images whose parameter hierarchies are lower than the parameter operation image are updated according to the specification selected by the operation with respect to the first operation image 21.

6 Claims, 5 Drawing Sheets

MOBILE TERMINAL TEST APPARATUS, MOBILE TERMINAL TEST SYSTEM, AND CONTROL METHOD FOR MOBILE TERMINAL TEST APPARATUS

TECHNICAL FIELD

The present invention relates to a mobile terminal test apparatus, a mobile terminal test system, and a control method for the mobile terminal test apparatus.

BACKGROUND ART

In the related art, as in a technology proposed in Patent Document 1, a technology has been proposed for displaying, on a display device, a setting item setting area, in which one or more windows for setting a setting item and a test value determined for each setting item are displayed, and a test result display area which displays a test result.

RELATED ART DOCUMENT

[Patent Document]
[Patent Document 1] JP-A-2014-72838 (paragraph 0033, FIG. 2)

DISCLOSURE OF THE INVENTION

Problem that the Invention is to Solve

However, in such a technology according to the related art, it is necessary to set the number of setting items and parameters to be determined for each setting item according to a specification of a test, so that there is a problem in that setting of the parameters becomes a burden on a user.

The present invention has been made to solve the problem, and an object of the present invention is to provide a mobile terminal test apparatus, a mobile terminal test system, and a control method for the mobile terminal test apparatus, which can reduce burden on a user for setting parameters according to a specification of a test.

Means for Solving the Problem

According to the present invention, there is provided a mobile terminal test apparatus including
a pseudo base station unit (10) that functions as a base station for a mobile terminal (2);
a test control unit (13) that tests the mobile terminal by controlling the pseudo base station unit;
a display unit (14); and
an operation unit (15), in which
the mobile terminal test apparatus displays, on the display unit, a setting screen (20) for performing a setting related to a test executed by the test control unit by an operation of the operation unit, and
the test control unit
displays, on the setting screen, a first operation image (21) for selecting a specification of the test executed by the test control unit, and a second operation image (22) in which parameter operation images (22a to 22e) for setting parameters for executing the test according to the specification selected by an operation with respect to the first operation image are arranged based on parameter hierarchies, and
updates, by an operation of changing one parameter with respect to the parameter operation image, lower parameter operation images whose parameter hierarchies are lower than the parameter operation image according to the specification selected by the operation with respect to the first operation image.

With the configuration, in the mobile terminal test apparatus of the present invention, it is possible to set parameters according to the specification of the test by, after selecting the specification of the test of the mobile terminal by the operation with respect to the first operation image, operating the parameter operation images in order arranged in the second operation image, so that it is possible to reduce burdens on the user for setting the parameters according to the specification of the test.

In the mobile terminal test apparatus of the present invention, the test control unit may switch a display mode of the setting screen according to the operation of the operation unit between a detailed mode in which a third operation image (23) for setting a test condition is displayed on the setting screen together with the first operation image and the second operation image, and a simplified mode in which the first operation image and the second operation image are displayed on the setting screen without displaying the third operation image on the setting screen.

With the configuration, in the mobile terminal test apparatus of the present invention, it is possible to set parameters according to the specification of the test by, after selecting the specification of the test of the mobile terminal by the operation with respect to the first operation image, operating the parameter operation images in order arranged in the second operation image in any display mode of the detailed mode and the simplified mode in a state in which the test condition is set by an operation with respect to the third operation image in the detailed mode, so that it is possible to reduce the burdens on the user for setting the parameters according to the specification of the test and the test condition.

Further, in the mobile terminal test apparatus of the present invention, the test control unit may display, on the setting screen, an item list image (28) representing a list of test items on a specification corresponding to a specification selected by an operation with respect to the first operation image and a parameter selected by an operation with respect to the second operation image.

With the configuration, in the mobile terminal test apparatus of the present invention, the item list image representing the list of test items on the specification determined by the operation with respect to the first operation image and the second operation image is displayed on the setting screen, so that it is possible to confirm content of the test without confirming the test items on the specification recorded on a book or a storage medium.

According to the present invention, there is provided a mobile terminal test system including
a mobile terminal test apparatus (1) that tests a mobile terminal (2); and
a test control apparatus (4) that controls the mobile terminal test apparatus, in which
the mobile terminal test apparatus includes
a pseudo base station unit (10) that functions as a base station for the mobile terminal,
the test control apparatus includes
a test control unit (13) that controls the pseudo base station unit,
a display unit (14), and
an operation unit (15), the mobile terminal test apparatus displays, on the display unit, a setting screen (20) for performing a setting related to a test executed by the test control unit by an operation of the operation unit, and the test control unit displays, on the display unit, the setting screen (20) for setting parameters of a test executed by the test control unit by the operation of the operation unit, displays, on the setting screen, a first operation image (21) for selecting a specification of the test executed by the test control unit, and a second operation image (22) in which parameter operation images (22a to 22e) for setting parameters for executing the test according to the specification selected by an operation with respect to the first operation image are arranged based on parameter hierarchies, and updates, by an operation of changing one parameter with respect to the parameter operation image, lower parameter operation images whose parameter hierarchies are lower than the parameter operation image according to the specification selected by the operation with respect to the first operation image.

With the configuration, in the mobile terminal test system of the present invention, it is possible to set parameters according to the specification of the test by, after selecting the specification of the test of the mobile terminal by the operation with respect to the first operation image, operating the parameter operation images in order arranged in the second operation image, so that it is possible to reduce burdens on the user for setting the parameters according to the specification of the test.

According to the present invention, there is provided a control method of a mobile terminal test apparatus (1) including a pseudo base station unit (10) that functions as a base station for a mobile terminal (2), and a test control unit (13) that tests the mobile terminal by controlling the pseudo base station unit, in which the mobile terminal test apparatus displaying, on a display unit (14), a setting screen (20) for performing a setting related to a test executed by the test control unit by an operation of an operation unit (15), the control method including: causing the test control unit to execute:

displaying, on the setting screen, a first operation image (21) for selecting a specification of the test executed by the test control unit, and a second operation image (22) in which parameter operation images (22a to 22e) for setting parameters for executing the test according to the specification selected by an operation with respect to the first operation image are arranged based on parameter hierarchies, and updating, by an operation of changing one parameter with respect to the parameter operation image, lower parameter operation images whose parameter hierarchies are lower than the parameter operation image according to the specification selected by the operation with respect to the first operation image.

As described above, in the control method of the mobile terminal test apparatus of the present invention, it is possible to set parameters according to the specification of the test by, after selecting the specification of the test of the mobile terminal by the operation with respect to the first operation image, operating the parameter operation images in order arranged in the second operation image, so that it is possible to reduce burdens on the user for setting the parameters according to the specification of the test.

[Advantage of the Invention]

According to the present invention, it is possible to provide a mobile terminal test apparatus, a mobile terminal test system, and a control method for the mobile terminal test apparatus, which can reduce burden on a user for setting parameters according to a specification of a test.

BEST MODE FOR CARRYING OUT THE INVENTION

Hereinafter, a mobile terminal test system according to an embodiment of the present invention will be described in detail with reference to the accompanying drawings. In the embodiment of the present invention, an example in which a mobile terminal test apparatus according to the present invention is applied to a mobile terminal test apparatus that tests a mobile terminal conforming to a standard specification of 5th Generation New Radio (5G NR) which is a 5G wireless system will be described.

In a standard specification of 5G NR, a carrier aggregation technology is introduced. The carrier aggregation is a technology for improving a transmission speed by performing communication using a plurality of carriers at the same time.

In the carrier aggregation, the communication is performed using a plurality of carriers called component carriers (hereinafter, also referred to as "CC"). In the carrier aggregation, the communication is performed by one primary component carrier (hereinafter, also referred to as "PCC"), which is a CC required for a mobile terminal to maintain a connection with a base station, and one or more secondary component carriers (hereinafter, also referred to as "SCC") which are CCs used to improve the transmission speed between the mobile terminal and the base station.

Further, the mobile terminal test apparatus according to the embodiment of the present invention corresponds to Multiple-Input and Multiple-Output (MIMO) in which the communication is performed by using a plurality of antennas in both a transmission side and a reception side. That is, the mobile terminal test apparatus according to the embodiment of the present invention can reproduce a state in which each CC is transmitted from a plurality of antennas.

Figure 1:
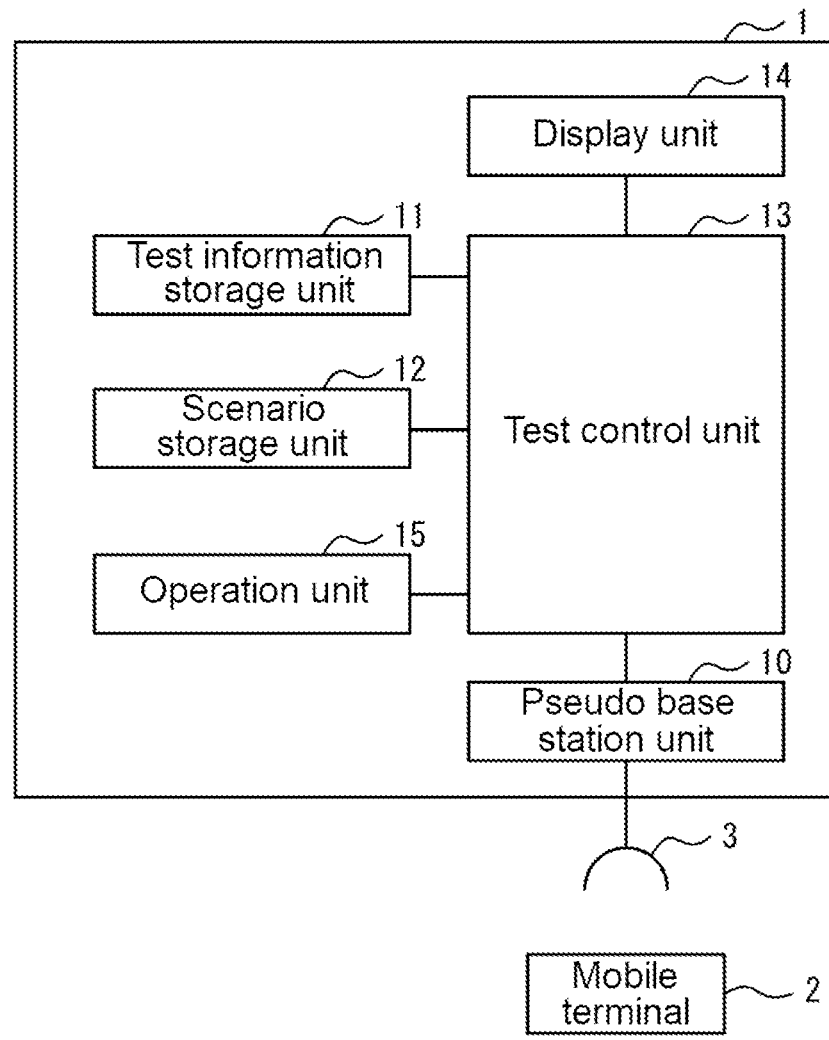
FIG. 1 is a block diagram of a mobile terminal test apparatus according to an embodiment of the present invention.

As shown in FIG. 1, a mobile terminal test apparatus 1 transmits and receives a signal to and from a mobile terminal 2 via an antenna 3 in wireless manner. Further, the mobile terminal test apparatus 1 can transmit and receive the signal to and from the mobile terminal 2 via a coaxial cable or the like in wired manner.

The mobile terminal test apparatus 1 includes a pseudo base station unit 10 that functions as a base station of a mobile terminal, a test information storage unit 11 that stores test information including parameters for controlling the pseudo base station unit 10, a scenario storage unit 12 that stores information including a scenario defined according to a specification of a test for the mobile terminal, a test control unit 13 that controls the pseudo base station unit 10, a display unit 14, and an operation unit 15.

Here, the mobile terminal test apparatus 1 includes a computer device (not shown) provided with a communication circuit for performing communication with the mobile terminal 2. The computer device includes a Central Processing Unit (CPU), a Read Only Memory (ROM), a Random Access Memory (RAM), a hard disk device, a display device, and an input device, each of which is not shown.

A program for making the computer device function as the mobile terminal test apparatus 1 is stored in the ROM and the hard disk device of the computer device. That is, when the CPU executes the program stored in the ROM, with the RAM as a work area, the computer device functions as the mobile terminal test apparatus 1.

The pseudo base station unit 10 includes a CPU and a communication circuit. The test information storage unit 11 includes a hard disk device. The test control unit 13 includes a CPU. The scenario storage unit 12 includes a ROM or a hard disk device.

The display unit 14 includes a display device such as a liquid crystal display device. The operation unit 15 includes an input device such as a keyboard device or a pointing device. For example, the operation unit 15 may include a touch pad integrally provided with the liquid crystal display device included in the display unit 14.

The mobile terminal test apparatus 1 can execute a test corresponding to a plurality of specifications in Technical Specification (TS) 38 series of a 3rd Generation Partnership Project (3GPP) such as "3GPPTS38.521-1 (FR1SA)", "3GPPTS38.521-3 (FR1NSA)" and "3GPPTS38.521-3 (FR2NSA)". A scenario according to each specification is stored in the scenario storage unit 12. Parameters of each test in each specification are stored in the test information storage unit 11.

When the operation unit 15 instructs start of a test of the mobile terminal 2, the test control unit 13 controls the pseudo base station unit 10 based on the scenario stored in the scenario storage unit 12 according to the specification of the test represented by a first operation image 21 and the parameters stored in the test information storage unit 11.

Figure 2:
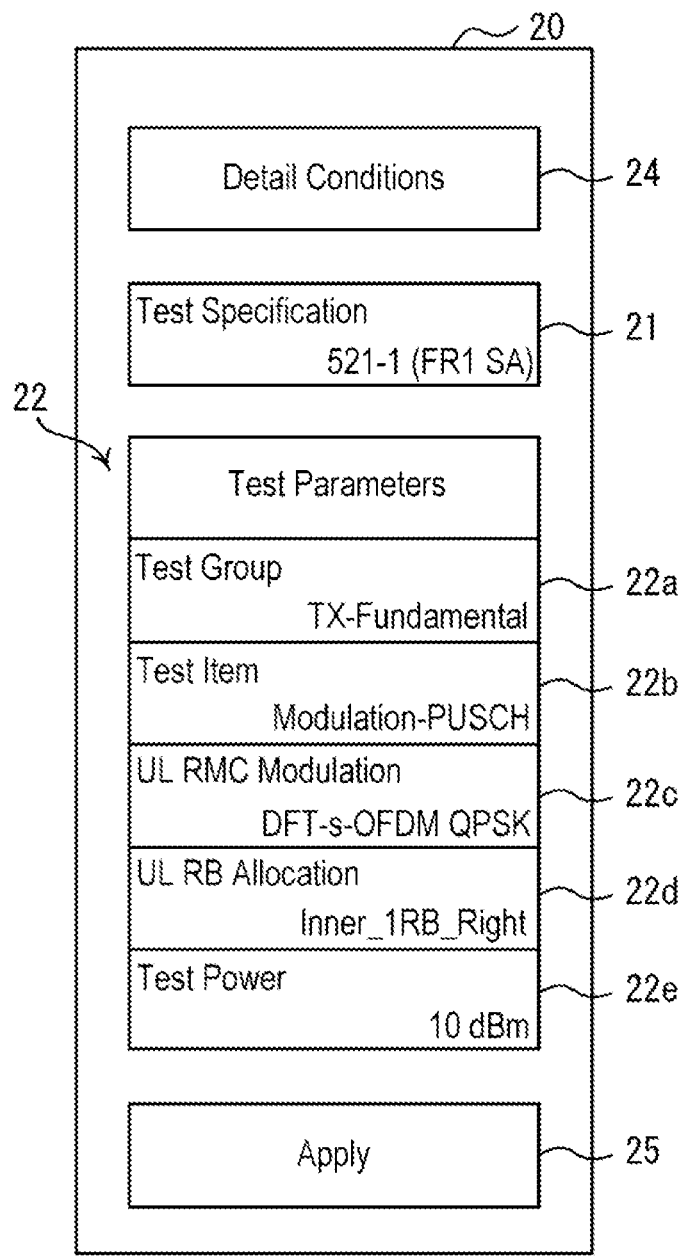
FIG. 2 is a conceptual diagram showing a display example of a display screen of a simplified mode displayed on a display device by the mobile terminal test apparatus according to the embodiment of the present invention.

As shown in FIG. 2, the test control unit 13 displays, on the display unit 14, a setting screen 20 for updating parameters, which are related to the test stored in the test information storage unit 11, by an operation of the operation unit 15.

For example, the test control unit 13 displays, on the display unit 14, the setting screen 20 based on a fact that start of the mobile terminal test apparatus 1 is completed or a fact that the display of the setting screen 20 is requested by the operation of the operation unit 15.

The setting screen 20 is displayed with a mode switching button 24 for switching a display mode between a detailed mode and a simplified mode. The mode switching button 24 functions as a toggle display type button.

The mode switching button 24 switches the display mode to the simplified mode when being operated by the operation unit 15 in a case of the detailed mode, and switches the display mode to the detailed mode when being operated by the operation unit 15 in a case of the simplified mode. FIG. 2 shows a display example of the setting screen 20 in the simplified mode. A display example of the setting screen 20 in the detailed mode will be described later with reference to FIG. 4.

The setting screen 20 is displayed with a first operation image 21 for selecting the specification of the test executed by the test control unit 13, and a second operation image 22 in which parameter operation images 22a to 22e for setting parameters for executing the test according to the specification selected by an operation with respect to the first operation image are arranged based on parameter hierarchies.

In the example shown in FIG. 2, in the first operation image 21, "Test Specification" is displayed as an item name and "521-1 (FR1SA)" is displayed as a set value. In the present embodiment, the set value of "Test Specification" represents the specification. Therefore, the first operation image 21 in FIG. 2 represents that "3GPPTS38.521-1 (FR1SA)" is selected as the specification of the test.

Figure 3:
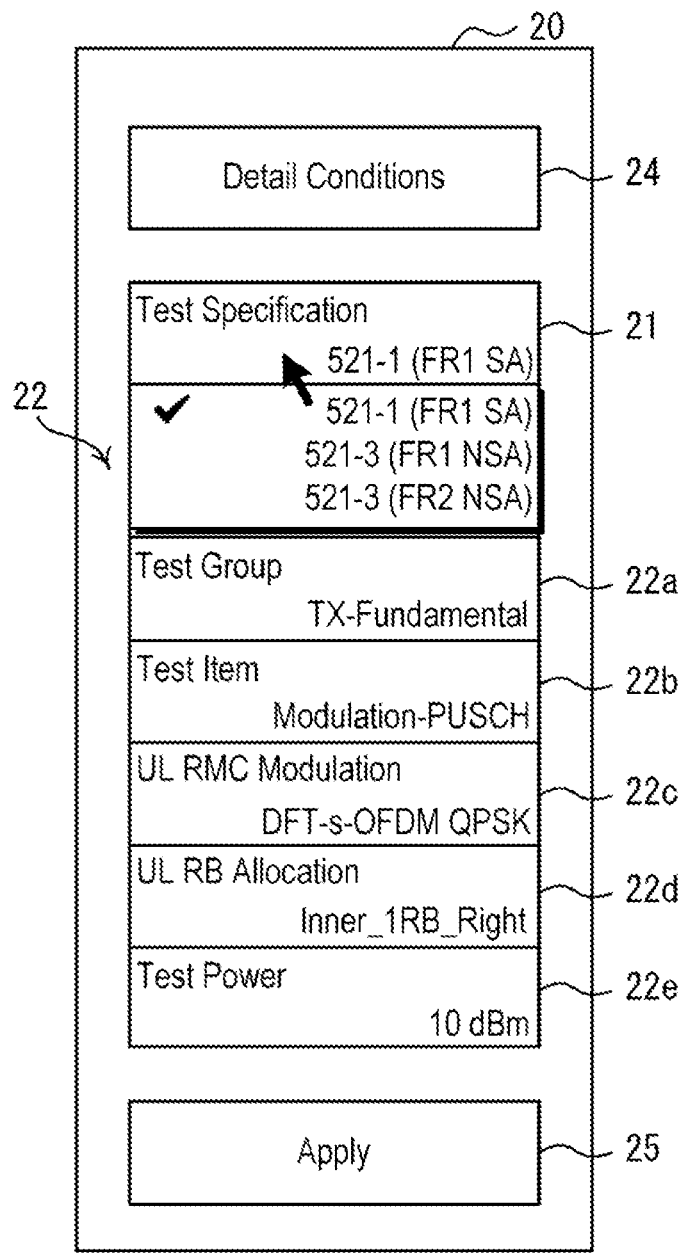
FIG. 3 is a conceptual diagram showing a display example of a state in which candidates for selection items are displayed on the display screen of the simplified mode displayed on the display device by the mobile terminal test apparatus according to the embodiment of the present invention.

As shown in FIG. 3, when the first operation image 21 is pressed by the operation of the operation unit 15, a pull-down menu is displayed at a position based on a position of the first operation image 21 (for example, below the first operation image 21).

In the pull-down menu, in addition to "3GPPTS38.521-1 (FR1SA)", selection items, which represent "3GPPTS38.521-3 (FR1NSA)" and "3GPPTS38.521-3 (FR2NSA)", are displayed, and, when the selection item is selected by the operation of the operation unit 15, the specification of the test is selected.

In the present embodiment, an example in which the pull-down menu is used as a user interface for selecting the set value is described. However, as the user interface for selecting the set value, it is preferable to adopt a user interface in an aspect according to a type of the set value to be selected by displaying a screen for selecting the set value from candidates of the set value or a screen for directly inputting the set value to be superimposed on the setting screen 20.

In FIG. 2, when the specification of the test is selected, the display numbers, display items, and set values of the parameter operation images 22a to 22e included in the second operation image 22 are updated as necessary. In the parameter operation image 22a, "Test Group" is displayed as the item name, and "TX-Fundamental" is displayed as the set value.

The set value of "Test Group" represents a group of the test (hereinafter, also referred to as a "test group") on which classification is performed according to the specification selected in the first operation image 21. "Test Group" is a parameter in a first hierarchy (top level).

When the parameter operation image 22a is pressed by the operation of the operation unit 15, the pull-down menu is displayed at a position based on a position of the parameter operation image 22a (for example, below the parameter operation image 22a).

In the pull-down menu, for example, in addition to "TX-Fundamental", selection items such as "TX-Time Mask", "TX-Power Control", and "RX" are displayed, and the selection item is selected by the operation of the operation unit 15, so that the test group is selected.

When the test group is selected, the display numbers, the display items, and the set values of the parameter operation images 22b to 22e are updated as necessary. In the parameter operation image 22b, "Test Item" is displayed as the item name, and "Modulation-PUSCH" is displayed as the set value.

The set value of "Test Item" represents a test item belonging to the test group selected in the parameter operation image 22a in the specification selected in the first operation image 21. "Test Item" is a parameter in a second hierarchy.

When the parameter operation image 22b is pressed by the operation of the operation unit 15, the pull-down menu is displayed at a position based on a position of the parameter operation image 22b (for example, below the parameter operation image 22b).

In the pull-down menu, in addition to "Modulation-PUSCH", selection items, such as "Max. Power", "Configured Power", "Min. Power", "Modulation-PUCCH" and "Modulation-PRACH", are displayed, and the selection item is selected by the operation of the operation unit 15, so that the test item is selected.

When the test item is selected, the display numbers, the display items, and the set values of the parameter operation images 22c to 22e are updated as necessary. There is a case where the display number of the parameter operation images is 0 depending on the test item.

Each of the set values of each of the parameter operation images 22c to 22e uses the value of the parameter, which is stored in the test information storage unit 11 for each test item, as an initial value, and, when the set value is changed by the operation of the operation unit 15, the set value is maintained as a value obtained after being changed for each test item.

In the parameter operation image 22c, "UL RMC Modulation" is displayed as the item name, and "DFT-s-OFDMQPSK" is displayed as the set value. The set value of "UL RMC Modulation" represents a modulation system of an uplink reference measurement channel. "UL RMC Modulation" is a parameter in a third hierarchy.

When the parameter operation image 22c is pressed by the operation of the operation unit 15, the pull-down menu is displayed at a position based on a position of the parameter operation image 22c (for example, below the parameter operation image 22c).

In the pull-down menu, in addition to "DFT-s-OFDMQPSK", selection items, which represent candidates of the modulation system according to the specification selected in the first operation image 21 and the test item selected in the parameter operation image 22b, are displayed, and the selection item is selected by the operation of the operation unit 15, so that the modulation system of the uplink reference measurement channel is selected.

In the parameter operation image 22d, "UL RB Allocation" is displayed as the item name, and "Inner_1RB_Right" is displayed as the set value. The set value of "UL RB Allocation" represents a combination of the number of resource blocks and the allocation positions of the resource blocks. "UL RB Allocation" is a parameter in the third hierarchy.

When the parameter operation image 22d is pressed by the operation of the operation unit 15, the pull-down menu is displayed at a position based on a position of the parameter operation image 22d (for example, below the parameter operation image 22d).

In the pull-down menu, in addition to "Inner_1RB_Right", selection items, which represent candidates of the combination of the number of resource blocks and the allocation positions of the resource blocks according to the specification selected in the first operation image 21 and the test item selected in the parameter operation image 22b, are displayed, and the selection item is selected by the operation of the operation unit 15, so that the combination of the number of resource blocks and the allocation position of the resource block is selected.

In the parameter operation image 22e, "Test Power" is displayed as the item name, and "10 dBm" is displayed as the set value. The set value of "Test Power" represents a transmission level of a test signal. "Test Power" is a parameter in the third hierarchy.

When the parameter operation image 22e is pressed by the operation of the operation unit 15, the pull-down menu is displayed at a position based on a position of the parameter operation image 22e (for example, below the parameter operation image 22e).

In the pull-down menu, in addition to "10 dBm", selection items, which represent candidates of the transmission level according to the specification selected in the first operation image 21 and the test item selected in the parameter operation image 22b, are displayed, and the selection item is selected by the operation of the operation unit 15, so that the transmission level is selected.

In addition to "UL RMC Modulation", "UL RB Allocation" and "Test Power", "UL RB Index", "DL RMC Modulation", "Test Point", "Power Pattern", "Test Type", and the like are provided as the parameter in the third hierarchy. The description for the parameter operation image corresponding to the parameters will be omitted.

When one parameter in the third hierarchy is changed, there is a case where the other parameters in the third hierarchy are affected as in a case where the number of the other parameters in the third hierarchy changes or the set values of the other parameters in the third hierarchy are out of a prescribed range.

The parameter in the third hierarchy, which affects the other parameters in the third hierarchy, is referred to as a parameter in an upper third hierarchy, and the parameters in the third hierarchy, which are affected by the parameter in the upper third hierarchy, are referred to as parameters in a lower third hierarchy.

In this case, in the second operation image 22, the parameter operation image corresponding to the parameter in the lower third hierarchy is displayed below the parameter operation image corresponding to the parameter in the upper third hierarchy.

Therefore, the parameters according to the specification of the test are selected by, after selecting the specification of the test by the operation with respect to the first operation image 21, operating the parameter operation images included in the second operation image 22 in order from the top.

The various parameters selected as described above are reflected in the test information storage unit 11 when an apply button 25 displayed on the setting screen 20 is operated by the operation unit. As a result, the parameters stored in the test information storage unit 11 are updated. The apply button 25 functions as a push-type button.

Figure 4:
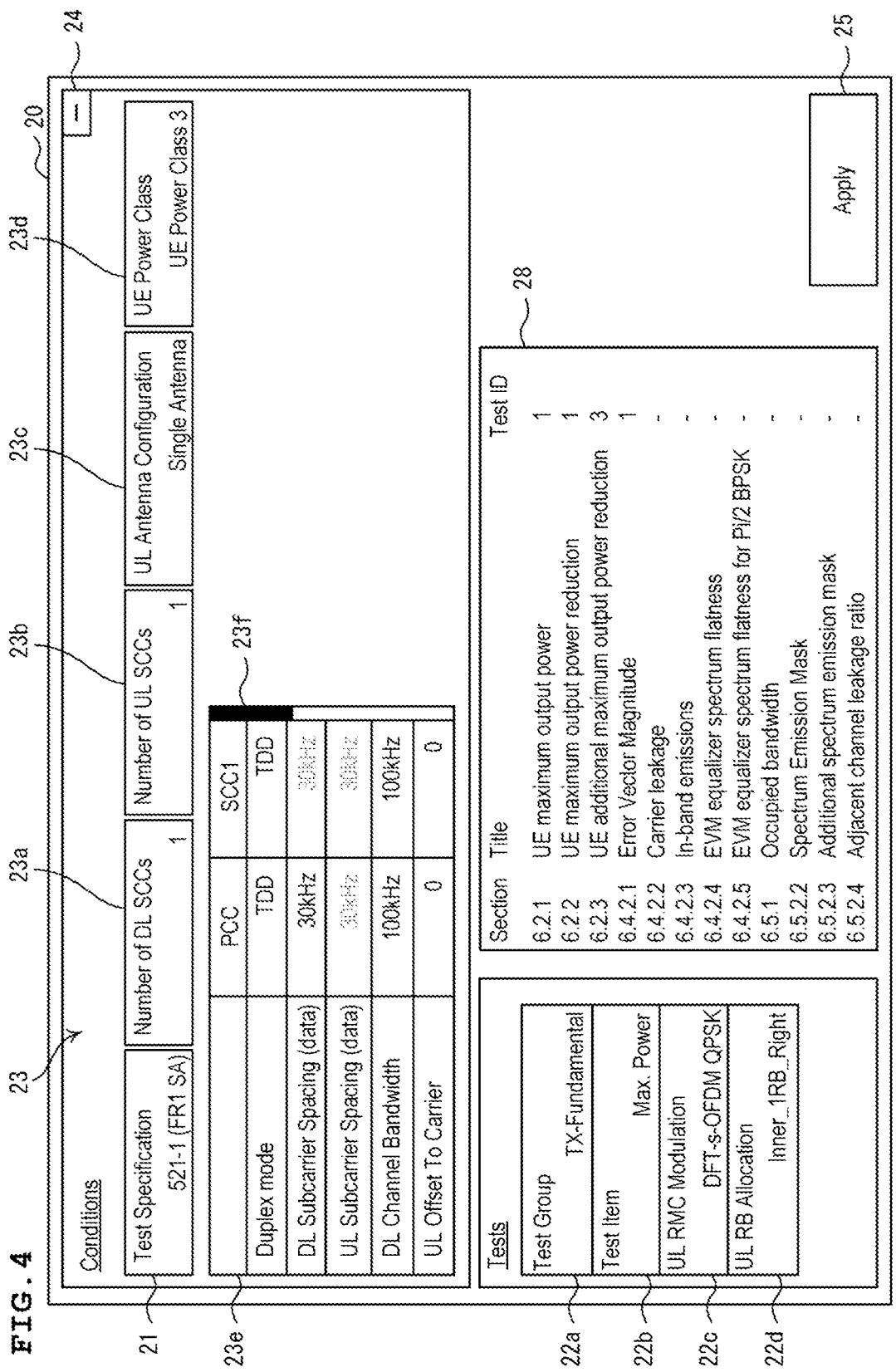
FIG. 4 is a conceptual diagram showing a display example of a display screen of a detailed mode displayed on the display device by the mobile terminal test apparatus according to the embodiment of the present invention.

FIG. 4 shows a display example of the setting screen 20 in the detailed mode. On setting screen 20 in the detailed mode, in addition to the first operation image 21 and the second operation image 22, a third operation image 23 for setting test conditions and an item list image 28 representing a list of test items are displayed.

In FIG. 4, "Max. Power" is displayed as a set value of the parameter operation image 22b. Since the number of parameters in the third hierarchy with respect to "Max. Power" is two including "UL RMC Modulation" and "UL RB Allocation", the parameter operation image 22e displayed in FIG. 2 is not included in the second operation image 22.

Each of the set values representing the test condition displayed in the third operation image 23 is stored in the test information storage unit 11 as the same as the set values of the parameter operation images 22c to 22e. Each of the set values representing the test condition displayed in the third operation image 23 has the value stored in the test information storage unit 11 as an initial value, and, when being changed by the operation of the operation unit 15, a value obtained after being changed is maintained.

A DL SCC operation image 23a, a UL SCC operation image 23b, a UL antenna operation image 23c, a power class operation image 23d, and a list image 23e are displayed in the third operation image 23.

In the DL SCC operation image 23a, "Number of DL SCC" is displayed as the item name, and "1" is displayed as the set value. The set value of the DL SCC operation image 23a represents the number of downlink SCCs.

In the UL SCC operation image 23b, "Number of UL SCC" is displayed as the item name, and "1" is displayed as the set value. The set value of the UL SCC operation image 23b represents the number of uplink SCCs.

In the UL antenna operation image 23c, "UL Antenna Configuration" is displayed as the item name, and "Single Antenna" is displayed as the set value. The set value of the UL antenna operation image 23c represents a state of the antenna 3 used for uplink. A selection item with respect to "UL Antenna Configuration" includes "Multiple Antenna" corresponding to MIMO in addition to "Single Antenna".

In the power class operation image 23d, "UE Power Class" is displayed as the item name, and "3" is displayed as the set value. The set value of the power class operation image 23d represents a class of the maximum transmission power of the mobile terminal 2, which is prescribed in the specification selected in the first operation image 21.

When each of the operation images 23a to 23d is pressed by the operation of the operation unit 15, the pull-down menu is displayed at the position based on the position of each of the operation images 23a to 23d (for example, below each of the operation images 23a to 23d), so that it is possible to select each of the set values.

In the list image 23e, operation images, such as "Duplex mode", "DL Subcarrier Spacing (data)", "UL Subcarrier Spacing (data)", "DL Channel Bandwidth", and "UL Offset To Carrier", for setting respective set values are arranged with respect to each of PCC and SCCs corresponding to the number selected in the UL SCC operation image 23b.

In FIG. 4, since the number selected in the UL SCC operation image 23b is 1, an operation image for the SCC 1 is arranged in the list image 23e. For example, when the number selected in the UL SCC operation image 23b is 2, operation images for SCC1 and SCC2 are arranged in the list image 23e.

Each operation image arranged in a "Duplex mode" line represents a multiplexing method in each CC. Each operation image arranged in a "DL Subcarrier Spacing (data)" line represents a downlink subcarrier width in each CC.

Each operation image arranged in a "UL Subcarrier Spacing (data)" line represents an uplink subcarrier width in each CC. Each operation image arranged in a "DL Channel Bandwidth" line represents a downlink channel bandwidth in each CC. Each operation image arranged in a "UL Offset To Carrier" line represents an uplink carrier offset frequency in each CC.

In the list image 23e, in addition to "Duplex mode", "DL Subcarrier Spacing (data)", "UL Subcarrier Spacing (data)", "DL Channel Bandwidth", and "UL Offset To Carrier", respective operation images for setting various other set values are arranged in association with respective CCs, but the description for the other various set values is omitted.

In the list image 23e shown in FIG. 4, a display area is insufficient to display all the operation images arranged with respect to the respective CCs, so that a scroll bar 23f is displayed in the list image 23e. It is possible to display the operation images for setting the other various set values by performing an operation with respect to the scroll bar 23f.

The operation images displayed on the list image 23e represent, for example, the set values, such as "DL Subcarrier Spacing (data)" with respect to SCC1 and "UL Subcarrier Spacing (data)" with respect to PCC and SCC1, which cannot be changed in the drawing.

Even when an operation image with respect to a set value that cannot be changed is pressed by the operation of the operation unit 15, the display of the pull-down menu is prohibited, that is, the pull-down menu is not displayed, so that the set value cannot be changed.

In the list image 23e, the set value that cannot be changed is displayed in a display state (a background, a character color, a character thickness, or a combination thereof) different from the set value that can be changed, so that the set value that cannot be changed is displayed to be identified from the set value that can be changed.

As described above, the various set values representing the test conditions selected in the third operation image 23 are reflected in the test information storage unit 11 when the apply button 25 displayed on the setting screen 20 is operated by the operation unit. As a result, the various set values representing the test conditions stored in the test information storage unit 11 are updated.

As above, the parameters according to the specification of the test and the test conditions by, after selecting the specification of the test by the operation with respect to the first operation image 21, operating the parameter operation images included in the second operation image 22 in order from the top are set in a state in which the test conditions are set by an operation with respect to the operation images 23a to 23d included in the third operation image 23 and the operation image displayed in the list image 23e.

The item list image 28 represents a list of test items on the specification corresponding to the specification selected in the first operation image 21 and the test items selected in the parameter operation image 22b. The list of test items on the specification is represented by a section number, a title, and a test ID in the specification in which the specification selected in the first operation image 21 is prescribed. The test ID is identification information corresponding to a combination of parameters predetermined in the specification, and may be changed depending on the set values of the parameter operation images 22c to 22e.

In the present embodiment, although an example, in which the item list image 28 is displayed on the setting screen 20 in the detailed mode and the item list image 28 is not displayed on the setting screen 20 in the simplified mode, has been described, the item list image 28 may be displayed on the setting screen 20 in the simplified mode.

As described above, in the present embodiment, it is possible to set the parameters according to the specification of the test by, after selecting the specification of the test of the mobile terminal 2 by the operation with respect to the first operation image 21, operating the parameter operation images 22a to 22e in the order arranged in the second operation image 22, so that it is possible to reduce burdens on the user for setting the parameters according to the specification of the test.

Further, in the present embodiment, it is possible to set parameters according to the specification of the test by, after selecting the specification of the test of the mobile terminal 2 by the operation with respect to the first operation image 21, operating the parameter operation images 22a to 22e in order arranged in the second operation image 22 in any display mode of the detailed mode and the simplified mode in a state in which the test condition is set by an operation with respect to the third operation image 23 in the detailed mode, so that it is possible to reduce burdens on the user for setting the parameters according to the specification of the test and the test condition.

Further, in the present embodiment, the item list image 28 representing the list of test items determined by the operation with respect to the first operation image 21 and the second operation image 22 is displayed on the setting screen 20, so that it is possible to confirm content of the test on the specification without confirming the test items on the specification recorded on a book or a storage medium.

Further, the mobile terminal test apparatus 1 in the present embodiment may be configured to be connected to a general-purpose computer apparatus including a CPU, a RAM, a ROM, a flash memory, a hard disk device, and a communication module.

Figure 5:
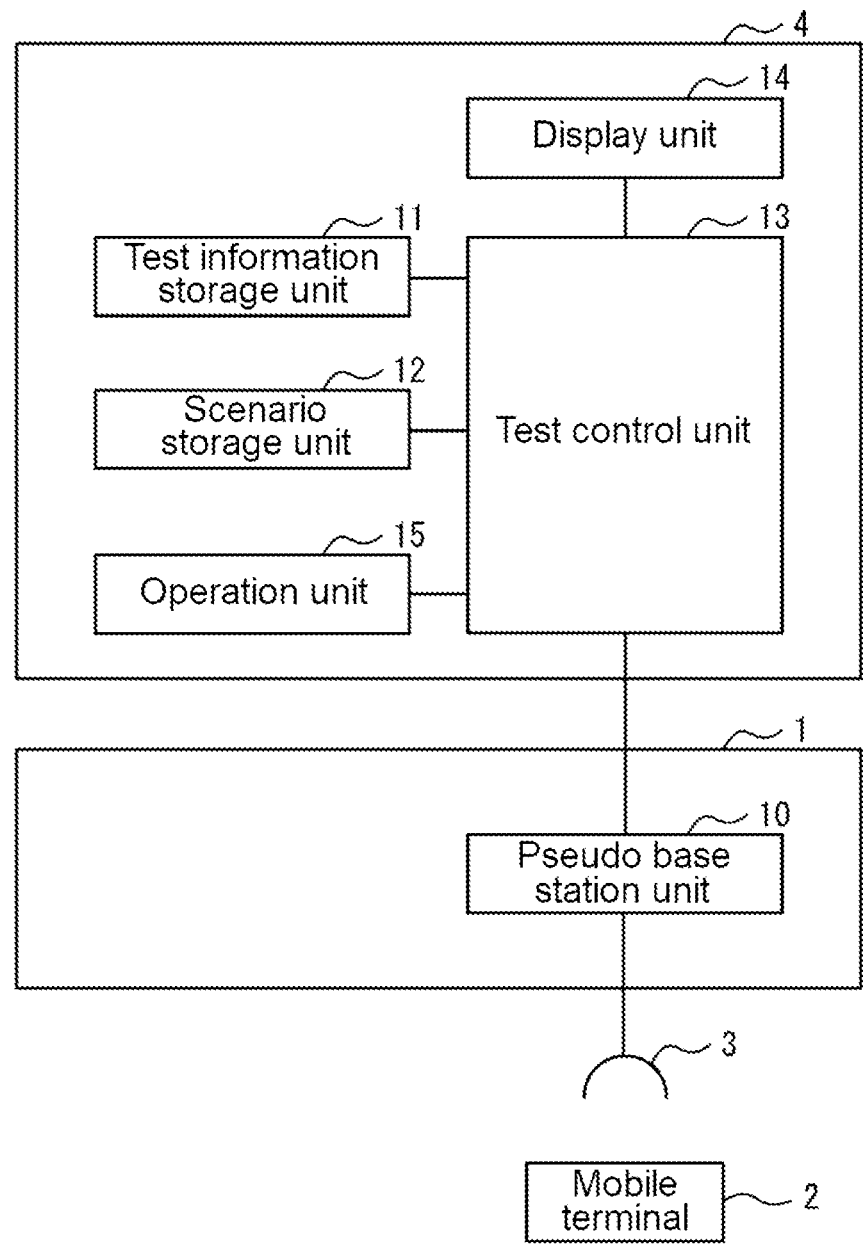
FIG. 5 is a block diagram of a mobile terminal test system according to a modification example of the embodiment of the present invention.

In this case, as shown in FIG. 5, the test control apparatus 4 including the test information storage unit 11, the scenario storage unit 12, the test control unit 13, the display unit 14, and the operation unit 15 is composed of a general-purpose computer apparatus, and the mobile terminal test system may be configured by the mobile terminal test apparatus 1 and the test control apparatus 4 excluding the test information storage unit 11, the scenario storage unit 12, the test control unit 13, the display unit 14, and the operation unit 15.

Although the embodiments of the present invention have been disclosed above, it is easy to make changes to the present embodiments of the present invention without departing from the scope of the present invention. Embodiments of the present invention are disclosed on the premise that the equivalent with such modifications is included in the invention described in the claims.

DESCRIPTION OF REFERENCE NUMERALS AND SIGNS

1 Mobile Terminal Test Apparatus
2 Mobile Terminal
4 Test Control Apparatus
10 Pseudo Base Station Unit
13 Test Control Unit
14 Display Unit
15 Operation Unit
20 Setting Screen
21 First Operation Image
22 Second Operation Image
22a to 22e Parameter Operation Image
23 Third Operation Image
28 Item List Image

What is claimed is:

1. A mobile terminal test apparatus comprising:
a pseudo base station unit that functions as a base station for a mobile terminal;
a test control unit that tests the mobile terminal by controlling the pseudo base station unit;
a display unit; and
an operation unit, wherein
the mobile terminal test apparatus displays, on the display unit, a setting screen for performing a setting related to a test executed by the test control unit by an operation of the operation unit, and
the test control unit
displays, on the setting screen, a first operation image for selecting a specification of the test executed by the test control unit, and a second operation image in which parameter operation images for setting parameters for executing the test according to the specification selected by an operation with respect to the first operation image are arranged based on parameter hierarchies, and
updates, by an operation of changing one parameter with respect to the parameter operation image, lower parameter operation images whose parameter hierarchies are lower than the parameter operation image according to the specification selected by the operation with respect to the first operation image.

2. The mobile terminal test apparatus according to claim 1, wherein
the test control unit switches a display mode of the setting screen according to the operation of the operation unit between a detailed mode in which a third operation image for setting a test condition is displayed on the setting screen together with the first operation image and the second operation image, and a simplified mode in which the first operation image and the second operation image are displayed on the setting screen without displaying the third operation image on the setting screen.

3. The mobile terminal test apparatus according to claim 1, wherein
the test control unit displays, on the setting screen, an item list image representing a list of test items on a specification corresponding to a specification selected by an operation with respect to the first operation image and a parameter selected by an operation with respect to the second operation image.

4. The mobile terminal test apparatus according to claim 2, wherein
the test control unit displays, on the setting screen, an item list image representing a list of test items on a specification corresponding to a specification selected by an operation with respect to the first operation image and a parameter selected by an operation with respect to the second operation image.

5. A mobile terminal test system comprising:
a mobile terminal test apparatus that tests a mobile terminal; and
a test control apparatus that controls the mobile terminal test apparatus, wherein
the mobile terminal test apparatus includes
a pseudo base station unit that functions as a base station for the mobile terminal,
the test control apparatus includes
a test control unit that controls the pseudo base station unit,
a display unit, and
an operation unit,
the mobile terminal test apparatus displays, on the display unit, a setting screen for performing a setting related to a test executed by the test control unit by an operation of the operation unit, and
the test control unit displays, on the display unit, the setting screen for setting parameters of a test executed by the test control unit by the operation of the operation unit, displays, on the setting screen, a first operation image for selecting a specification of the test executed by the test control unit, and a second operation image in which parameter operation images for setting parameters for executing the test according to the specification selected by an operation with respect to the first operation image are arranged based on parameter hierarchies, and updates, by an operation of changing one parameter with respect to the parameter operation image, lower parameter operation images whose parameter hierarchies are lower than the parameter operation image according to the specification selected by the operation with respect to the first operation image.

6. A control method of a mobile terminal test apparatus which includes a pseudo base station unit that functions as a base station for a mobile terminal, and a test control unit that tests the mobile terminal by controlling the pseudo base station unit, the mobile terminal test apparatus displaying, on a display unit, a setting screen for performing a setting related to a test executed by the test control unit by an operation of an operation unit, the control method comprising: causing the test control unit to execute:

displaying, on the setting screen, a first operation image for selecting a specification of the test executed by the test control unit, and a second operation image in which parameter operation images for setting parameters for executing the test according to the specification selected by an operation with respect to the first operation image are arranged based on parameter hierarchies, and updating, by an operation of changing one parameter with respect to the parameter operation image, lower parameter operation images whose parameter hierarchies are lower than the parameter operation image according to the specification selected by the operation with respect to the first operation image.

* * * * *